(No Model.)
A. H. ARMEN.
OHMMETER.
No. 528,268. Patented Oct. 30, 1894.
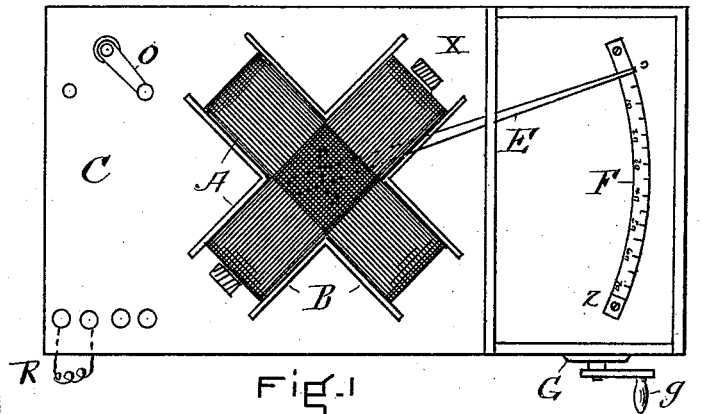
Fig. 1.
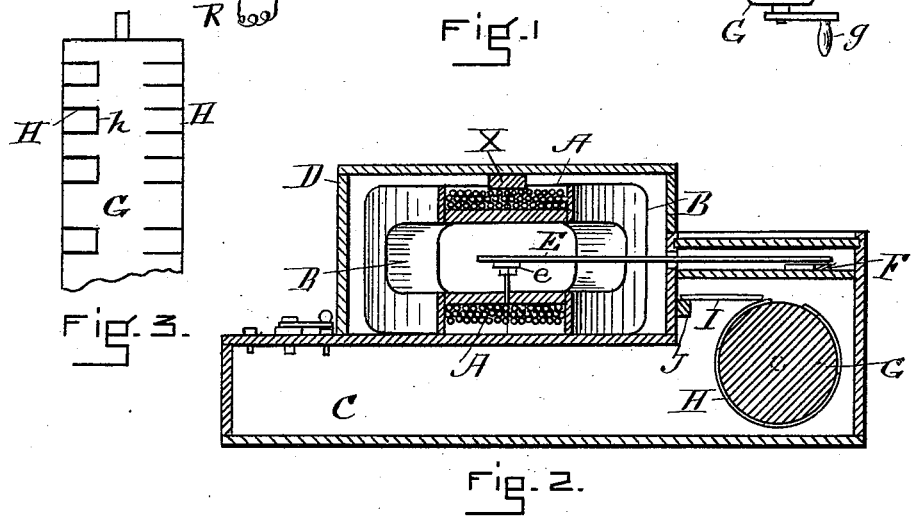
Fig. 3.
Fig. 2.
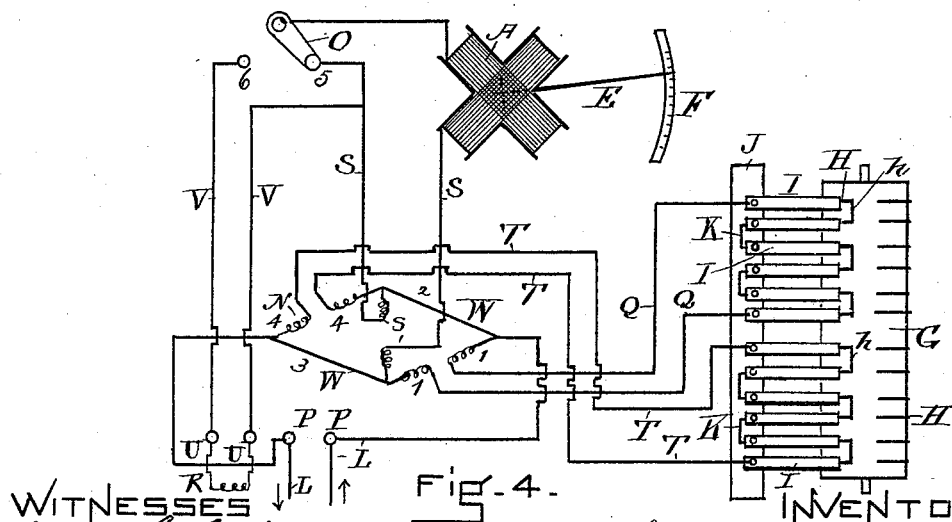
Fig. 4.
WITNESSES
Frank G. Parker
Edward S. Day
INVENTOR
Arakelyan H. Armen
by R. H. Benedict, Atty

UNITED STATES PATENT OFFICE.

ARAKELYAN H. ARMEN, OF LYNN, MASSACHUSETTS.

OHMMETER.

SPECIFICATION forming part of Letters Patent No. 528,268, dated October 30, 1894.

Application filed April 21, 1894. Serial No. 508,457. (No model.)

*To all whom it may concern:*

Be it known that I, ARAKELYAN H. ARMEN, of Lynn, in the county of Essex and State of Massachusetts, have invented certain new and useful Improvements in Ohmmeters, of which the following, taken in connection with the accompanying drawings, is a specification.

The object of my invention is to measure the resistance of wire to electrical currents by a pointer and graduated arc similar to volt meters.

By my improvement I am able to give one uniform amount of current to a measuring instrument, and in this manner the resistance of a wire may be measured on the index or dial.

I attain the object of my invention by the combined use of an index with an indicating mark, a Wheatstone's bridge, a rheostat and a coil with a magnetic needle and a pointer vibrating in said coil and also with a magnet external to said coil.

In the drawings, Figure 1 is a top plan of the instrument, the casing over the coil and pointer being removed. Fig. 2 is a vertical section through the instrument and its casing. Fig. 3 is a partial plan view of the rheostat cylinder, and Fig. 4 is a diagram illustrating the operation of my devices.

A represents a cruciform coil of insulated wire wound on the spool B, mounted for use on a box C, and covered as in Fig. 2 by a top casing D. In the hollow center of this spool and coil a magnetic needle e with a pointer E is pivoted, its free end projecting so as to vibrate and traverse the graduated arc or index F. A magnet X is mounted with its poles turned down and in close proximity to the coil A. It is seen only in section in Figs. 1 and 2 in order not to conceal the coil and position of the needles.

The coil A has two separate windings, the spool B, being so formed as to receive them in succession.

G is the rheostat cylinder, upon the surface of which I secure wires H of German silver or other metal giving high resistance. These wires nearly surround the cylinder and are arranged in pairs, as in Figs. 3 and 4, the two wires of each pair being joined laterally at one end and being disconnected from each other at the opposite end.

I I are copper brushes, fixed on a non-conducting strip J and projecting so as to each rest upon one of the wires H.

The rheostat is located in the higher part of the box C, as shown in Fig. 2. When the cylinder G is turned to the right by its crank g, (Fig. 1) the extent of resistance-wire from brush to brush is gradually increased, until finally the whole length of each wire is brought into the circuit. When turned in the opposite direction the extent of these wires in the circuit is gradually lessened, until finally only the transverse connecting wire *h* which joins two adjacent wires H remains, and the resistance is greatly reduced. The fixed ends of the brushes I I are connected transversely in pairs by short strips or wires K which join the ends of those brushes which are not connected by the wires *h* at their free ends, as will be clear from Fig. 4. In this figure W represents Wheatstone's bridge, which is located but not shown in the lower part of box C, in Fig. 2, P P the binding posts, and L L the main lines, connected to said bridge.

S S S is the real bridge in which the coil A is embraced. The arm of the bridge W is connected to one half of the rheostat G H I by the wires Q Q and the arm 4 is similarly connected to the other half of the rheostat by the wires T T.

U U are the binding posts for the resistance wires R to be measured. They are connected with the circuit passing through the coil A, by the wires V V.

O is the switch, Figs. 1 and 4.

The operation of my apparatus is as follows: When the instrument is at rest, as when no current is passing through the coil, the pointer E will be at the end Z of the index F, opposite to the position shown in Fig. 1. The magnetic needle *e* tends to point in the direction of the magnet, when at rest. The current entering the coil actuates the needle *e* and pointer E, moving the pointer gradually away from the point Z, into the position shown in Fig. 1. The reverse action would occur if the coil were differently wound, that is, the indicating mark denoting the normal amount of current would be differently placed and the pointer would stop at zero when at rest. Now, since a uniform amount of current cannot ordinarily be secured from a source of electricity at different times, we cannot measure resistance by voltmeter or ammeter. In my instrument, however, such measurement is possible, because I can give to the coil a uniform amount of current, no matter what the source of electricity may be, and this is attained by the combined use of the rheostats and the bridge. The current enters, as indicated by the dart, Fig. 4, and reaches the bridge W. As is well known, when the four arms of the bridge W have equal resistance no current will be diverted therefrom to the coil A through the real bridge S S S. In other words, the bridge S S S will have no potential unless we change the relative resistance of the arms of the bridge W. Referring now to Fig. 4, it will be seen that the arms 1 and 4 are connected to the rheostats G H I and consequently their resistance is increased or decreased as compared with the arms 2 and 3, and hence the current will be sent to the coil A through the real bridge S S S. In this way I can take from the main current any desired amount of electricity and send it to the coil A by the action of the rheostats.

It will be seen that my instrument, embracing the evenly-working double rheostat, acts as a current adjuster, by which to withdraw a desired amount of electricity from larger volumes thereof. The current taken from the main circuit and given to the coil by the adjuster is a derived current, and the voltage and amperage of such derived current maintain the same ratio to each other while increased or decreased by the adjuster.

The crank g, seen at one end of the instrument in Fig. 1, is a detachable key, and is removed in Fig. 4.

When the switch O is on the post 5 as in Fig. 4, the coil A is in the circuit of the real bridge S S S, but when it is on post 6, I introduce into the coil circuit the new resistance to be measured, by means of the binding posts U U, to which the resistance wire R is connected. I effect this measurement in the following manner: I connect the resistance wire R to the posts U U, and the main wires L L or posts P P to the source of electricity. The switch will be on post 5 as in Fig. 1, and the pointer E at Z before starting. Then in passing the current the pointer E moves along the index F to the zero point, which represents the normal amount of the uniform current desired. If the pointer passes by or fails to reach the zero point I regulate the amount of current by turning the crank of the rheostat in the proper direction. The instrument is only in condition to measure the resistance of wire R when the pointer is at zero, that is, at the indicating mark. When this is attained the switch is shifted from post 5 to post 6, whereby the resistance wire R is brought into the circuit of the coil A. The vibration of the pointer under these conditions follows, the pointer moving toward the point Z to an extent corresponding to the amount of resistance introduced into the current; and thus the resistance is measured in ohms, and is made visible to the eye.

I claim as my invention—

1. In an instrument for measuring ohms of electrical resistance, the combination with an index and vibrating pointer, of means for taking a uniform, normal amount of current from a larger volume thereof, such means consisting essentially of a gradually-increasing rheostat having conducting wires H arranged in pairs connected at one end by transverse wires h, brushes I bearing on said wires H, and connections K for said brushes, and also of the bridge W, and the indicating mark denoting the normal amount of current, substantially as set forth.

2. The rheostat cylinder G having resistance wires H h secured upon and nearly surrounding it, in combination with the brushes J each adapted to rest at its free end upon one of the wires H, and with the electrical connecting strips K joining alternate brushes J, substantially as set forth.

3. The improved rheostat described, consisting of a single cylinder G, and two distinct sets of resistance wires H h, coiled about said cylinder at its respective ends, and with two distinct sets of brushes I I bearing upon said wires H h, in combination with the two arms 1 and 4 of the bridge W, substantially as set forth.

4. The instrument described having the box C and top casing D in combination with Wheatstone's bridge in the lower part of said box, the rheostat in its higher part, and with a coil and a magnet without said casing, and an index and projecting pointer above the rheostat in said case, substantially as set forth.

In testimony whereof I have signed my name to this specification, in the presence of two subscribing witnesses, on this 9th day of April, A. D. 1894.

ARAKELYAN H. ARMEN.

Witnesses:
A. H. SPENCER,
CHARLES G. KEYES.